US012717655B2

(12) United States Patent
Maeda et al.

(10) Patent No.: US 12,717,655 B2
(45) Date of Patent: Aug. 25, 2026

(54) CONDITIONAL LOCKING MECHANISM FOR CONCURRENT RESOURCE ACCESS IN A MULTI-THREADED ENVIRONMENT

(71) Applicant: Microsoft Technology Licensing, LLC, Redmond, WA (US)

(72) Inventors: Masato Maeda, Sammamish, WA (US); Rachel Slater, Seattle, WA (US); Alexander Brannon Carswell, Redmond, WA (US); Farzam Tafreshian, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 573 days.

(21) Appl. No.: 18/325,751

(22) Filed: May 30, 2023

(65) Prior Publication Data

US 2024/0289185 A1 Aug. 29, 2024

Related U.S. Application Data

(60) Provisional application No. 63/487,288, filed on Feb. 28, 2023.

(51) Int. Cl.
*G06F 9/52* (2006.01)
*G06F 9/48* (2006.01)

(52) U.S. Cl.
CPC ............ *G06F 9/528* (2013.01); *G06F 9/4881* (2013.01); *G06F 9/526* (2013.01)

(58) Field of Classification Search
CPC ......... G06F 9/528; G06F 9/4881; G06F 9/526
See application file for complete search history.

(56) References Cited

U.S. PATENT DOCUMENTS 6,598,068 B1 * 7/2003 Clark ........................ G06F 9/52 718/104
7,284,151 B2 10/2007 Chandrasekaran
(Continued)

FOREIGN PATENT DOCUMENTS

CN 106325980 A 1/2017
CN 103886109 B 4/2017
(Continued)

OTHER PUBLICATIONS

International Search Report and Written Opinion received for PCT Application No. PCT/US2024/016410, Aug. 13, 2024, 12 pages.
(Continued)

*Primary Examiner* — Michael W Ayers
(74) *Attorney, Agent, or Firm* — Holzer Patel Drennan

(57) ABSTRACT

A conditional locking system receives, from a request source, a request to execute an operation on a target resource on behalf of a client thread. The system generates a unique key based on an attribute of the request and searches a concurrency dictionary for an entry identifying the unique key. In response to determining that the concurrency dictionary does include an entry identifying the unique key, the system identifies a lock object associated in the entry with the unique key and transmits a request to acquire the lock object. Once the lock object associated with the unique key has been acquired on behalf of the client thread, the system transmits a lock acquisition confirmation to the request source.

22 Claims, 5 Drawing Sheets

(56) References Cited

U.S. PATENT DOCUMENTS

| | | | | |
|---|---|---|---|---|
| 8,918,791 | B1 * | 12/2014 | Chudgar | G06F 9/526 718/104 |
| 9,251,080 | B2 | 2/2016 | Dai et al. | |
| 9,560,134 | B1 | 1/2017 | Smith | |
| 10,102,127 | B2 | 10/2018 | Dai et al. | |
| 2009/0063488 | A1 * | 3/2009 | Daum | G06F 16/2343 |
| 2010/0250507 | A1 | 9/2010 | Omara et al. | |
| 2013/0185270 | A1 | 7/2013 | Brower | |
| 2015/0205646 | A1 * | 7/2015 | Singh | G06F 9/526 718/106 |
| 2021/0232441 | A1 | 7/2021 | Lee et al. | |
| 2022/0114100 | A1 * | 4/2022 | David | G06F 12/0815 |
| 2022/0391374 | A1 * | 12/2022 | McKnight | G06F 16/2343 |
| 2023/0025760 | A1 * | 1/2023 | Nip | G06F 9/52 |

FOREIGN PATENT DOCUMENTS

| | | | |
|---|---|---|---|
| CN | 110888723 | A | 3/2020 |
| CN | 107861799 | B | 12/2020 |
| CN | 114327877 | A | 4/2022 |

OTHER PUBLICATIONS

International Preliminary Report on Patentability (Chapter I) received for PCT Application No. PCT/US2024/016410, Sep. 11, 2025, 7 pages.

"ConcurrentDictionary<TKey,TValue> Class", Retrieved From: https://web.archive.org/web/20230113160249/https://web.archive.org/learn.microsoft.com/en-us/dotnet/api/system.collections.concurrent.concurrentdictionary-2?view=net-7.0, Jan. 13, 2023, 26 Pages.

"Critical Section", Retrieved From: https://en.wikipedia.org/wiki/Critical_section, Dec. 27, 2022, 5 Pages.

"How to make cache thread-safe in your .NET C# application", Retrieved From: https://web.archive.org/web/20221117093251/https:/docs.groupdocs.com/viewer/net/how-to-make-cache-thread-safe-in-your-net-csharp-application/, Nov. 17, 2022, 6 Pages.

"Semaphore Class in C#", Retrieved From: https://web.archive.org/web/20220929205036/https:/dotnettutorials.net/lesson/semaphore-in-multithreading/, Sep. 29, 2022, 6 Pages.

"Thread Safety in Java", Retrieved from: https://www.digitalocean.com/community/tutorials/thread-safety-in-java, Aug. 3, 2022, 16 Pages.

"Using mutexes", Retrieved from: https://www.ibm.com/docs/en/aix/7.2?topic=programming-using-mutexes, Retrieved Date: Mar. 31, 2023, 11 Pages.

Surwase, Radhakishan, "Implementation of Thread-Safe Dictionary Data Structure in Golang", Retrieved From : https://levelup.gitconnected.com/implementation-of-thread-safe-dictionary-data-structure-in-golang-2bcb235fd9e4, Aug. 28, 2020, 11 Pages.

Ugarte, Alejandro, "What is Thread-Safety and How to Achieve it?", Retrieved From : https://www.baeldung.com/java-thread-safety, Mar. 28, 2022, 21 Pages.

Wagner, et al., "lock statement—ensure exclusive access to a shared resource", Retrieved from: https://learn.microsoft.com/en-us/dotnet/csharp/language-reference/statements/lock, Apr. 28, 2023, 4 Pages.

* cited by examiner

CONDITIONAL LOCKING MECHANISM FOR CONCURRENT RESOURCE ACCESS IN A MULTI-THREADED ENVIRONMENT

CROSS-REFERENCE TO RELATED APPLICATIONS

The present application claims priority to U.S. provisional patent application Ser. No. 63/487,288 filed on Feb. 28, 2023, and entitled "Conditional Locking Mechanism for Concurrent Resource Access in a Multi-Threaded Environment," which is hereby incorporated by reference for all that it discloses or teaches.

BACKGROUND

Within a multi-threaded environment, an application is capable of receiving and processing requests from more than one user at a time without requiring multiple copies of the application executing. A multi-threaded application running on a cloud-based server can concurrently receive, process, and answer requests from multiple client devices. Multi-threaded environments can be problematic in certain scenarios where different threads seek concurrent access to a shared resource and present race conditions. A race condition occurs when two different threads attempt to access the same resource at the same time, such as to cause an overwrite of data that is still being read. Race conditions can cause a program to crash, to identify an illegal operation of the program, or to return errors in reading the old data or in writing the new data.

To avoid race conditions, current systems commonly implement various types of locking mechanisms. These locking mechanisms often serve to lock the entire object or target (e.g., node) storing data that is being modified to prevent concurrent access. For example, a file system may lock a particular storage node whenever any data residing on the storage node is being updated. Alternatively, an entire database may be temporarily rendered unavailable while being accessed by a single user. While effective, these existing locking mechanisms are over-inclusive in the sense that they prevent concurrent handling of some requests that do not actually present race conditions. For example, two tables in the same database can, in theory, be concurrently updated without presenting an actual problem provided that the values stored in the two tables are completely independent of one another. Over-inclusive locking of system resources undesirably reduces system throughput by preventing some concurrent access operations that could, in theory, be executed without error.

SUMMARY

According to one implementation, a method includes receiving, from a multi-threaded application, a request identifying an operation on a target resource requested by a first client thread and generating a unique key based on an attribute of the request. The method further includes searching a concurrency dictionary for an entry identifying the unique key and, in response to determining that the concurrency dictionary does include an entry identifying the unique key, transmitting a request on behalf of the first client thread for acquisition of a lock object corresponding to a lock identifier associated with the unique key in the entry. The method further provides for transmitting a lock acquisition confirmation to the multi-threaded application in response to determining that the first client thread has acquired the lock object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
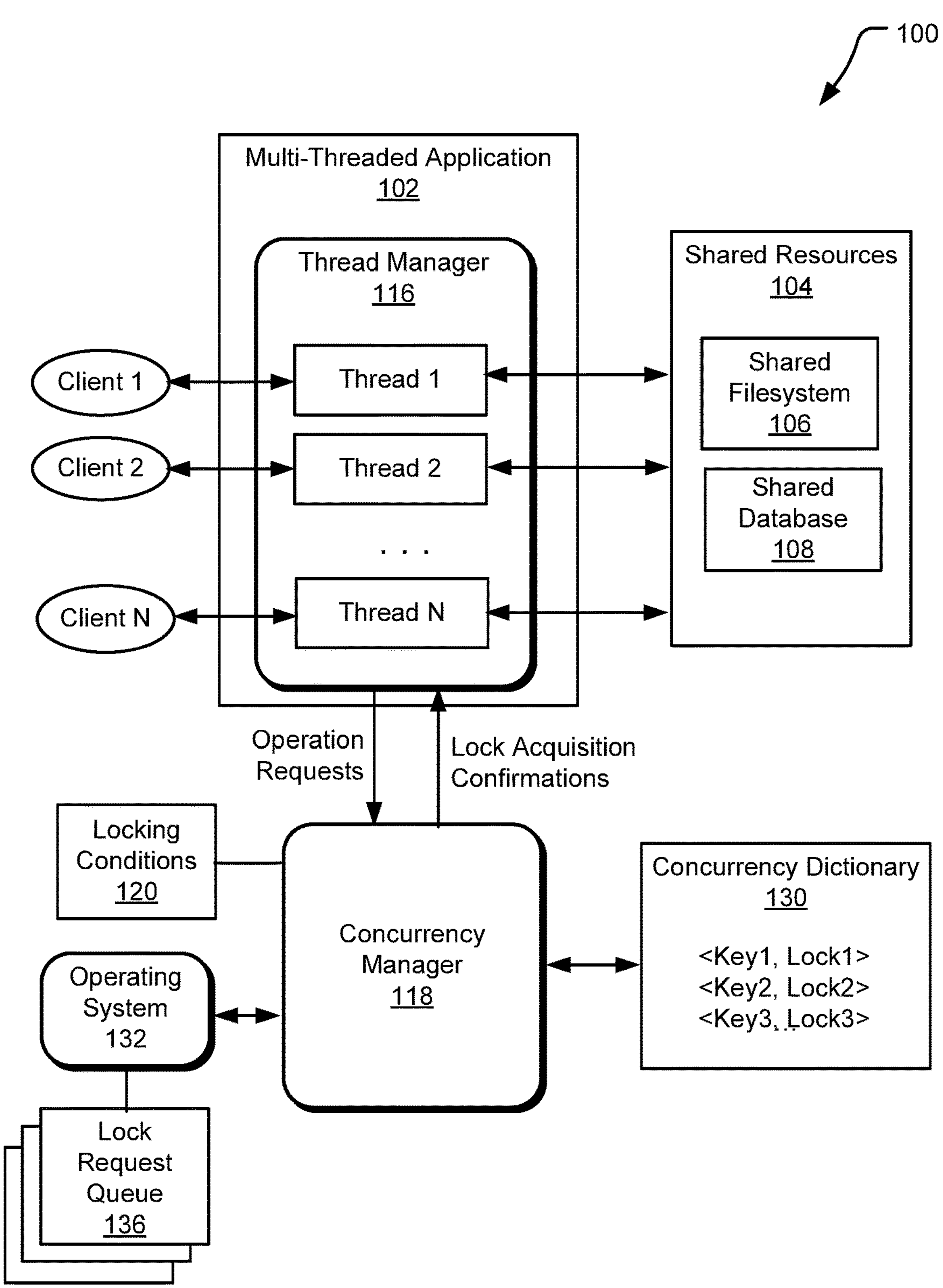
FIG. 1 illustrates an example multi-threaded system that conditionally locks certain resources to prevent race conditions from arising.

The disclosed technology provides a conditional locking mechanism that allows a resource to be conditionally locked during instances of an access operation executing on the resource based on developer-defined conditions that include, for example, attributes of the access operation and/or of the target being acted upon by the access operation. As used herein, the "target" of an access operation refers to either the entire resource being subjected to the access operation or a specific portion of a resource being subjected to the access operation. For example, the target may be an object or file or a portion of an object or file.

As used herein, the term "conditionally lock" refers to a prohibition on access to the target of an access operation that is conditionally enacted based on certain defined (e.g., developer-defined) conditions, such as while another access operation is concurrently executing on the same target. In some implementations, the conditions of a lock-protected operation are defined by attributes of a particular access operation that is conditionally prohibited when the lock is in effect and/or by attributes of a target that is subject to the access operation. Example attributes of an access operation include, for example, the type of access operation (e.g., read, write, transfer, execute, delete) and the parameters specified in a call to execute the access operation. Example attributes of a target accessed via an access operation that may also serve as locking conditions include an identifier of the target, physical and/or logical location of the target, a name of the target, the version of the target, and/or the contents of the target.

One example of a conditional lock defined based on an attribute of the access operation is a lock that prevents concurrent execution of a particular type of access operation on a same target. For example, the conditional lock prohibits concurrent write operations on a target but permits concurrent read operations on the target. An example of a conditional lock defined based on an attribute of the target is a lock that prevents concurrent execution of operations on files that share certain characteristics (e.g., same name, same version, same storage location).

The disclosed technology facilitates conditionally locking certain resources under circumstances that are defined at a finer level of granularity than is possible using existing locking mechanisms. Per the disclosed technology, a developer or user can define conditions of a lock based on any combination of attributes of the access operation they desire to prohibit and/or of one or more targets operated on by the prohibited access operation. In one implementation, this use of attributes permits a developer or user to prohibit a particular operation a on a subcomponent of an object in an object-oriented programming language while permitting the same or similar operations on other subcomponents of the same object. For example, the object-oriented programming language may define a database as an individual object and the developer or user can, in this same language, define a lock that prohibits operation(s) on an individual database table or even an individual cell in a particular database table while other portions of the same database remain accessible.

Using the disclosed tool that allows a developer or user to define multiple access operation attributes and/or target attributes that serve as conditions for a lock, the developer or user can identify the circumstances that threaten race conditions and limit resource locking to the specific access operations that actually present those threatening circumstances. This methodology serves to increase concurrency in a multi-thread environment as compared to systems that impose source or object-based locking.

FIG. 1 illustrates an example multi-threaded system 100 including a concurrency manager 118 that conditionally locks certain resources to prevent race conditions from arising when different threads attempt to concurrently access a same one or multiple shared resources 104. The multi-threaded system 100 includes a multi-threaded application 102 which is, for example, a cloud-based server process executed by an operating system (OS) 132 of a cloud-based server.

The multi-threaded application 102 includes a thread manager 116 that concurrently manages active threads (e.g., thread 1, thread 2, . . . thread N) associated with multiple different client devices (e.g., client 1, client 2, . . . client N). The different threads each may occasionally request access to one or more of the shared resources, such as by requesting to read, modify, or transfer one or more files of a shared file system 106 and/or to read or modify data within a shared database 108. Requests to access to the shared resource 104 are fielded by a concurrency manager 118 that conditionally locks and unlocks various assets from among the shared resources 104 based on locking conditions 120 (e.g., developer-defined conditions). In one implementation, the concurrency manager 118 is an application executed by the OS 132 on the same cloud-based server supporting the multi-threaded application 102.

Upon receiving each new request to initiate an access operation on a target, the concurrency manager 118 evaluates the request and determines whether it pertains to a lock-protected operation. In various implementations, this evaluation is performed based on attributes of the operation request, attributes of a target identified, and/or any other readily-definable criteria. For example, a lock-protected operation is a write operation to a database or a file transfer on a shared system.

Per the herein disclosed conditional locking mechanisms, a lock-protected operation prevents concurrent execution of a carefully defined subset of other operations (e.g., those that may present race conditions) but does not typically serve to prevent concurrent execution of all other operations executing on the same target resource.

Provided that a requested access operation is a lock-protected operation, the concurrency manager 118 next identifies an applicable set of the locking conditions 120 defined in association with the applicable lock-protected operation. According to one implementation, the locking conditions 120 for a given lock-protected operation specify one or more attribute fields corresponding to attributes of an access operation request and/or of an access operation target, collectively referred to below as "attributes of the request." As is discussed further below, these attributes effectively define the conditions of the corresponding lock. All lock-protected operations with attributes satisfying a same set of the locking conditions 120 are associated with the same lock, and this lock needs to be acquired to execute each such operation.

When the concurrency manager 118 receives a request to initiate a lock-protected operation, the concurrency manager 118 identifies attributes of the request that correspond to the applicable set of locking conditions, and from these attributes, generates a key. For each repeated instance of a given lock-protected operation, a new key is generated based on the attributes of the request. Per this methodology, identical keys are generated whenever two instances of a lock-protected access operation are characterized by identical attributes satisfying an applicable set of the locking conditions 120.

The key generated for each lock-protected access operation serves to define the nature of the protected operation by effectively defining the conditions of the lock in terms of attributes of the request. After generating the key in association with an instance of access operation, the concurrency manager 118 checks a concurrency dictionary 130 to determine whether the key is currently in use by an existing process. The key is determined to be "in use" when there exists an entry in the concurrency dictionary 130 that identifies the key in association with an existing lock object.

If the concurrency manager 118 searches the concurrency dictionary 130 and determines that the key for a requested operation is currently in use with another lock object, the concurrency manager 118 places a request for the already-existing lock with the OS 132, and the requesting thread enters a "wait" until the existing lock is acquired.

If, upon checking the concurrency dictionary 130, the concurrency manager 118 determines that the key is not in use with an existing lock object, the concurrency dictionary 130 acquires a new lock object for the key. "Acquiring a new lock object" includes creating a new lock object, asking the OS 132 to assign the lock object to the requesting thread, and updating the concurrency dictionary 130 to include a new entry associating the key with the lock object once the lock has been assigned.

As used herein, a "lock object" or "lock" refers to a synchronization primitive that is provided by a device operating system (e.g., the OS 132) for the purpose of supporting thread or process synchronization. The lock object provides the OS with a software mechanism for tracking and prioritizing the order in which different threads are granted access to the lock. In one implementation, a lock object is associated with a count value (e.g., the thread count) that is incremented each time a new thread attempts to access the lock. For example, a count value of '1' implies that the lock object is in use by a single thread, while a count value of '2' implies that the lock object is in use by a first thread and that a second thread has requested access to the lock and is awaiting access to the lock. When the lock object is released from the first thread, the count value is decreased by 1, and the OS 132 reassigns the lock object to another thread waiting to acquire it.

In one implementation, searching the concurrency dictionary 130 and acquiring a new lock object are all performed as one atomic operation that cannot be interfered with by another requester. For example, a global synchronization object (e.g., another lock) is acquired to access the concurrency dictionary 130 (preventing other threads from checking the dictionary at the same time), and the concurrency dictionary 130 is updated at the exact same time that the new lock object is created.

In scenarios where an already-existing lock is requested (e.g., because the applicable key is paired with this existing lock), the search of the concurrency dictionary 130 and request for the lock object are performed as one atomic operation. For example, the global synchronization object is acquired to access the concurrency dictionary 130 (effectively locking the concurrency dictionary), and the concurrency manager 118 places a request with the OS 132 for the already-existing lock object before the global synchronization object is released. Upon receiving a request for an already-existing lock, the OS 132 adds an identifier of the requesting thread (e.g., "Thread 1") to an OS-managed queue associated with the requested lock object (e.g., a lock request queue 136), and the concurrency manager 118 increments a counter value stored within the lock object. At this point in time, the concurrency manager 118 informs the requesting thread that it needs to "wait" for the requested lock, and the atomic operation ends with the release of the global synchronization object protecting the concurrency dictionary 130 allowing other requests to be processed by the concurrency manager 118. In the meantime, the OS 132 continues to wait on the threads in each lock request queue (e.g., the lock request queue 136) in the order in which the lock requests were received (or other order determined by the OS 132), communicating with the concurrency manager 218 each time an existing lock is reassigned.

The above-described use of different lock objects to protect different operations satisfying different sets of the locking conditions 120 effectively guarantees that the race conditions do not occur in relation to any individual operation protected by one of the lock objects. Although lock objects are traditionally used to prevent race conditions, the disclosed key-specific architecture improves upon such systems by limiting the application of any individual lock by a set of conditions satisfied by operations that are most likely to present race conditions (e.g., as opposed to implementing locks that apply to entire databases, file systems, etc.). This allows locking to be performed at a finer level of granularity, leading to higher system throughput and improved overall system performance.

By example, a set of locking conditions for a given lock-protected operation may specify parameters such as "file name" and "version identifier (ID)" (e.g., in reference to the filename and version of a resource accessed by the operation). In this example, a key is generated based on the name and version of the target to the access operation, and the conditional lock functions to prevent concurrent access operations on targets that share a name and version identifier. Alternatively, the above example can be further refined by expanding the set of locking conditions to additionally specify an operation type identifier (e.g., type is "transfer" or "write" or "read"). In this case, the key is generated based on the name and version of the resource targeted as well as based on the type of operation. In an example where the operation type is "transfer" the resulting conditional lock functions to prohibit concurrent transfer operations on targets that share a name and version identifier.

One can imagine that the above example can be further refined by the addition of still further locking conditions, such as a condition satisfied when the target is being transferred to a particular storage node. In this further example, the key is generated based on the name and version of the resource targeted as well as based on the type of operation (e.g., transfer) and the specified destination for the transfer. The resulting conditional lock functions to prohibit concurrent transfer operations on targets that share a name and version identifier only when the transfer operations target a common destination node.

Notably, a developer can define any number of locking conditions in association with a defined type of lock-protected operation. In one implementation, the key for a conditional lock is generated by concatenating or otherwise combining the attributes of the request corresponding to the locking conditions 120 for the lock-protected operation. If, for example, the lock-protected operation is designed to prevent concurrent transfers of files with identical file names to a common destination node, the concurrency manager 118 generates a unique key for the lock-protected operation by combining (e.g., concatenating) a filename specified in the access operation request (e.g., file=foo.txt) to a destination node identifier (e.g., node=1234) specified in the access operation request, thereby generating a resulting key from the filename and destination node identifier (e.g., foo.txt1234). In this or other similar manner, any combination of attributes can be subjected to a defined set of combinatorial rules (e.g., rules for concatenation and/or hash value generation) to generate a unique key for the conditional lock.

Notably, the above-described methodology may result in scenarios where the key effectively places a lock on certain data that is part of a larger object. Take, for example, the scenario where a unique key is generated based on a table identifier specified in a database access operation. Here, the resulting unique key functions to prevent concurrent accesses to the same table regardless or not that table is subcomponent of a larger object (e.g., a database) in the applicable object-oriented programming language. The same logic could be extended to prevent concurrent accesses to an individual cell within a table (e.g., by defining a unique key based on table name, row ID, and column ID). In contrast to this, existing locking solutions tend to be implemented at the object level (e.g., locking the entire database rather than its subcomponents).

Notably, the above type of logic is extendable to file structures as well as databases, such as to prevent concurrent accesses to an individual directory on a particular node or instead to prevent concurrent accesses to files with certain characteristics that are stored in a particular location (e.g., a directory) on a particular node. Because the disclosed locking mechanism uses attributes of the request to define the conditions of each lock, the resulting lock can be imposed at variable levels of granularity, effectively corresponding to any defined set of attributes for a given access operation request.

Figure 2:
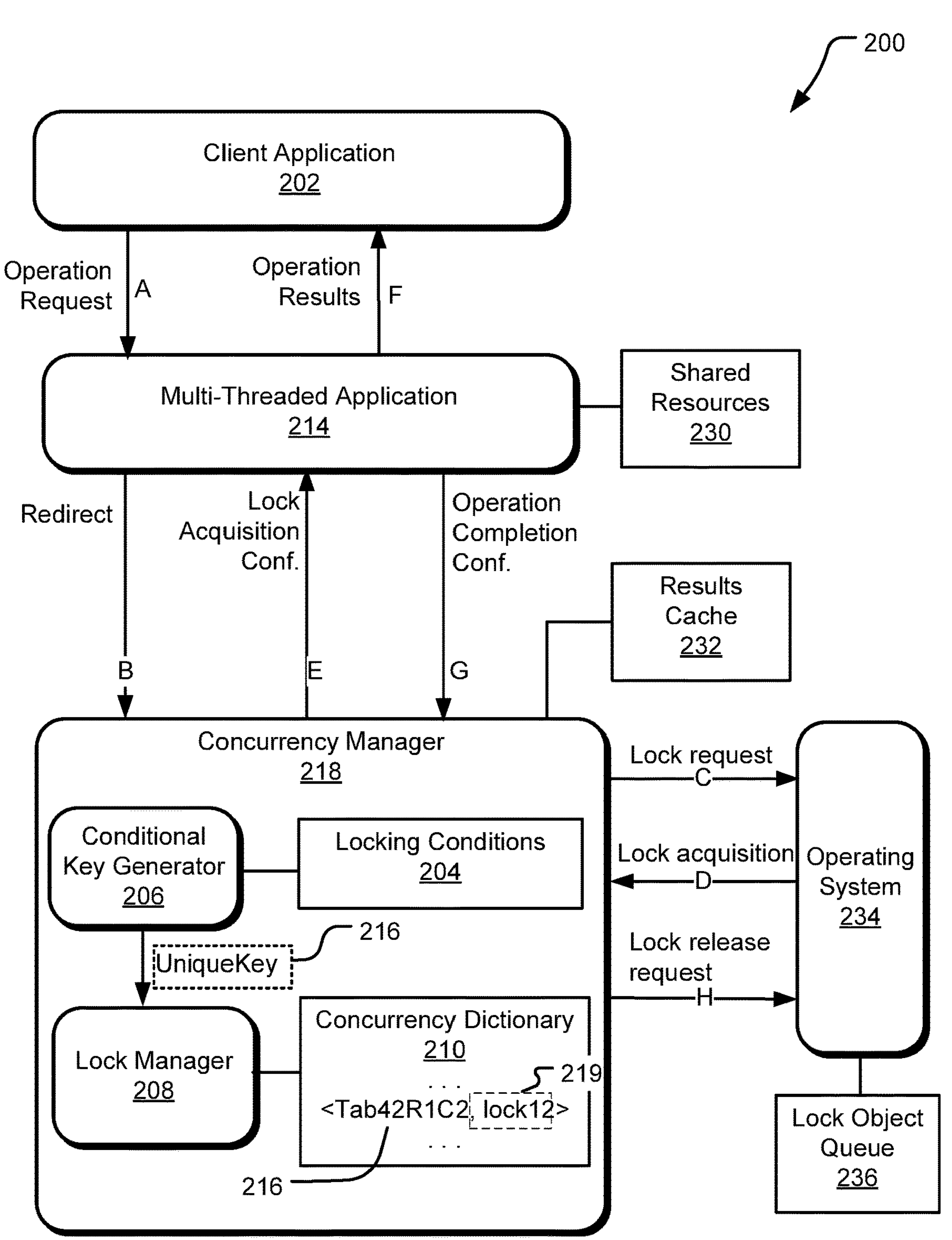
FIG. 2 illustrates example components of another system that utilizes conditional locking to prevent concurrent execution of certain operations on shared resources.

FIG. 2 illustrates example components of another system 200 that utilizes conditional locking to prevent concurrent execution of operations with potential to present race conditions. The system 200 is, in one implementation, integrated within a larger system having characteristics the same or similar as those depicted and/or discussed with respect to FIG. 1.

The system 200 includes a multi-threaded application 214 that receives requests from various client applications (e.g., on different client devices) to access shared resources 230. Each request from a different client application (or different instances of the same client application on different devices) is received via a different corresponding communication thread, and the multi-threaded application 214 is configured to communicate with multiple different communication threads in parallel. The multi-threaded application 214 directs requests for access of the shared resources 230 to a concurrency manager 218, and the concurrency manager 218 performs actions that facilitate conditional resource locking on the shared resources 230.

In FIG. 2, a client application 202 is shown placing a request (at arrow A) to access a particular one of the shared resources 230. The multi-threaded application 214 receives this request and redirects the request to the concurrency manager 218 (at arrow B). In one implementation, the concurrency manager 218 performs an initial assessment to determine whether the requested operation has been defined (e.g., by a developer) as a lock-protected operation. For example, a developer defines certain types of operations that are subjected to lock-protection operations. Notably, many different locks may be associated with a single set type of lock-protected operation. For example, a database update is defined as one type of lock protected operation, but different locks are acquired when updating different rows or cells within the database.

Provided that the operation request is identified as a lock-protected operation, a conditional key generator 206 identifies an applicable set of locking conditions 204 (e.g., attribute fields) and further identifies a set of attributes of the operation request that correspond to each one of the locking conditions 204. To further the above example of a database update, the locking conditions 204 may include attribute fields "table ID," "row ID," and "column ID" (e.g., conditions that define a data cell to be locked).

Other examples of attribute fields that may serve as the locking conditions 120 include the type of access operation requested (e.g., read, write, transfer, execute), parameters specified within the access operation request (e.g., the name of the target resource, a storage location of the target resource, a location where the target resource is being moved by the operation, a file version identifier), and/or other characteristics of the target resource that may not be specified directly in the access operation request (e.g., specific content included within the target resource, the author of the target resource).

From these attribute fields defined by the locking conditions 204 in association with the applicable type of lock-protected operation, the conditional key generator 206 generates a key 216, which is a unique key usable to perform the associated conditional locking operation. If, for example, the locking conditions 204 of a database access operation include the attribute fields: table ID, row ID, and column ID, the key 216 is generated from these three attributes.

Due to the manner in which it is generated, the key 216 embodies the set of attributes satisfied by the specific access operation(s) that are prohibited when the key is in use (e.g., when the conditional lock is in effect). In various implementations, these attributes can be combined to create the key 216 per any defined set of combinatorial rules. For example, the key 216 is created by concatenating together strings corresponding to each of the attributes of the request corresponding to the locking conditions 204 or by creating and combining hash values corresponding to each of the attributes. In an implementation that applies the former approach (e.g., concatenating string values representing the attributes), a key "db1_table14row2col4" is formed by concatenating a database identifier, table identifier, row identifier, and column identifier corresponding to a particular table cell targeted by a requested access operation.

Once the key 216 is created for a particular lock-protected access operation requested by a client thread (e.g., by the client application 202), the key 216 is provided to a lock manager 208 that, in turn, determines whether the key is already in-use by an active operation or, alternatively, whether the key 216 is available for use by the access operation requested by the client application 202. To make this determination, the lock manager 208 references a concurrency dictionary 210 that maintains a listing of key-lock pairs, where each key-lock pair includes a key generated as described above and a lock identifier (e.g., lock identifier 219) identifying a lock object that functions to facilitate thread synchronization by an operating system (OS 234) with respect to threads requesting access to the lock object. In FIG. 2, the operating system 234 is a local operating system on the processing device that executes the concurrency manager 218 and the multi-threaded application 214.

Each lock object with a corresponding identifier included within the concurrency dictionary 210 is an OS-provided synchronization primitive. In one implementation, each lock object stores or is otherwise associated with a count value indicative of the number of threads awaiting access to the lock object. This count value is incremented by the concurrency manager 218 each time the lock object is requested by a new thread and decremented each time the lock object is released from a thread (e.g., when the requested operation is completed on behalf of the thread).

An example key-lock pair in the concurrency dictionary 210 references the key 216 and also includes a lock identifier 219 for an existing lock object. In this example, the key 216 is "Table42R1C2," and was generated in response to receipt of a request to access a cell located in row 1 (R1), column 1 (C1) of a particular table identified by "42" in a particular database. The entry including this key-lock pair in the concurrency dictionary 210 implies that the key 216 is "in use" by another active operation. In this scenario, the lock manager 208 places a lock request asking the OS 234 to assign the lock identifier 219 to the requesting thread when it becomes available.

If, alternatively, the key 216 was not in use (and therefore available) when the concurrency dictionary 210 is searched, the key 216 does not appear in any entry of the concurrency dictionary 210. In this scenario, the lock manager 208 creates a new lock object, transmits a lock request asking the OS 234 to assign the new lock to the requesting thread, and creates a new entry in the concurrency dictionary 210 that pairs the key 216 with the newly-created lock object.

In both of the above scenarios (e.g., newly created lock or in-use existing lock), the concurrency manager 218 transmits a lock request asking the operating system 234 to assign the lock to the thread requesting the lock-protected operation. This lock request is indicated in FIG. 2 by arrow C.

If the lock manager 208 has just created a new lock object, the lock request (at arrow C) is granted immediately by the OS 234. Here, the concurrency manager 218 increments a counter value associated with the requested lock from "0" to "1," and the OS 234 assigns the identifier of the requesting thread to the lock identified by the lock identifier 219.

If the lock manager 208 is requesting assignment of an already-existing lock (e.g., an in-use lock), the concurrency manager 218 increments the counter value associated with the requested lock and the OS 234 adds a thread identifier for the requesting thread to an applicable queue associated with the requested lock (e.g., the queue 236). If, for example, the lock request is for the lock identified by "lock12," the OS 234 adds a thread identifier to the queue 236 that uniquely identifies the communication thread with the client application 202 that has placed the associated operation request. The queue 236 is listing of all threads currently waiting on acquisition of the lock object (e.g., "lock12"). The lock manager 208 sees the counter incrementation and places the requesting thread into a "wait" until the requested lock is acquired. The OS 234 waits on the threads in the queue 236 according to a prioritization order that is determined, at least in part, by the order in which the OS 234 receives the corresponding lock requests.

When the request placed on behalf of the client application 202 is finally waited on by the OS 234, the OS 234 transmits a confirmation of lock acquisition back to the concurrency manager 218 (e.g., at arrow D), and the concurrency manager 218 then conveys this confirmation to the multi-threaded application 214 (e.g., at arrow E), which effectively grants the multi-threaded application 214 authorization to execute the requested lock-protected operation on behalf of the requesting thread with the client application 202. In one implementation, the lock acquisition confirmation includes a new instance of a corresponding operations class returned via a private constructor, indicating to the caller that the operation is now safe to proceed.

Following receipt of the lock acquisition confirmation (at arrow E), the multi-threaded application 214 then executes the requested lock-protected operation and returns results of the operation (as applicable) to the client application 202, as indicated by arrow F. The multi-threaded application 214 informs the concurrency manager 218 when the operation has completed (e.g., at arrow G), and the concurrency manager 218, in turn, transmits a lock release request to the operation system 234 (e.g., at arrow H) that requests release of the lock-key pair from the thread associated with the client application 202.

The OS 234 releases the key-lock pair from the thread, and the concurrency manager 218 decrements the counter value of the corresponding lock object and removing the stored association between the lock object and the previous thread assigned to the lock object. This decrement of the counter value is followed either by reassignment of the lock-key pair (e.g., if other threads are awaiting access) or, in some implementations, destruction of the lock object. For example, the concurrency manager 218 destroys the lock object when the counter value of the lock object reaches 0.

If one or more other threads are awaiting use of the lock-key pair, the operating system 234 reassigns the lock-key pair to another thread (e.g., a next-in-queue thread). In this case, the operating system 234 transmits a lock acquisition confirmation back to the concurrency manager 218 that includes information identifying the new thread to which the lock-key pair has been reassigned. The concurrency manager 218, in turn, conveys the new lock acquisition confirmation to the multi-thread application 214 (e.g., as described above with respect to arrow E), the multi-thread application 214 executes the operation on behalf of this new thread, and the flow continues as described above with respect to arrows F-H.

In different implementations, the disclosed conditional-locking methodology is implemented using different types of lock objects. In one implementation, the lock object is a custom version of a semaphore object of the SemaphoreSlim class used when programming in C#, a Mutex object commonly used when programming in C, a spin lock, or any other type of object capable of synchronizing access to a shared resource.

In another implementation, the lock object is a semaphore object that stores a first value indicating a maximum number of threads permitted to simultaneously use the lock (e.g., 1) and a second value indicating a number of active threads currently awaiting use of the lock. For example, the lock object may be created using pseudocode:

Lock12=new CustomSemaphoreSlim (0, 1)

where "lock12" is an identifier assigned to the lock object, the value '0' represents the thread count (meaning, no other threads or keys are waiting for this lock) and the value '1' represents a max thread count (meaning the lock object is permitted to be used by a maximum of one thread at a time). Notably, use of a semaphore slim presents the potential to design conditional locks that can be concurrently by used by more than one thread (e.g., by setting the max thread count value in the above example to a value greater than 1). If, for example, a given system design constitutes that more than one thread can access a same shared resource without presenting race conditions, the developer can choose to conditionally lock-protect certain resources based on a pre-defined number of threads determined to be permitted concurrent access to the shared resource.

As described above, threads using and/or waiting on a particular lock are guaranteed synchronized access to the lock by way of atomically-executed counter incrementations and queue update operations, with a different counter and queue being associated with each lock. When the concurrency manager 218 requests assignment of a particular lock from the OS 234, the concurrency manager 218 increments the counter associated with the particular lock (e.g., the thread count stored by the lock) and the OS 234 either creates a memory association that assigns the lock to the requesting thread or adds an identifier of the requesting thread to a queue that is used by the OS 234 to provide synchronized accesses to the lock object.

The system 200 is shown to additionally include a results cache 232 that is optionally implemented to further maximize concurrent request processing. Upon successful completion of each access operation, the multi-threaded application 214 caches the results of the operation in the shared resource cache 232 in association with an identifier for the associated operation, such as the corresponding key 216 or other identifier. When the concurrency manager receives an access operation request and determines that the requisite key is in use, the concurrency manager 218 checks the shared resource cache 232 first for the results associated with the operation of interest. Provided the results are in fact already stored within the shared resource cache 232, the concurrency manager 218 can return the results of the corresponding requested operation to the requesting thread without tying up the shared resources 230.

Figure 3:
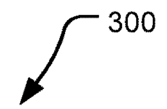
FIG. 3 illustrates example operations of a system that implements conditional locking techniques.
Figure 3:
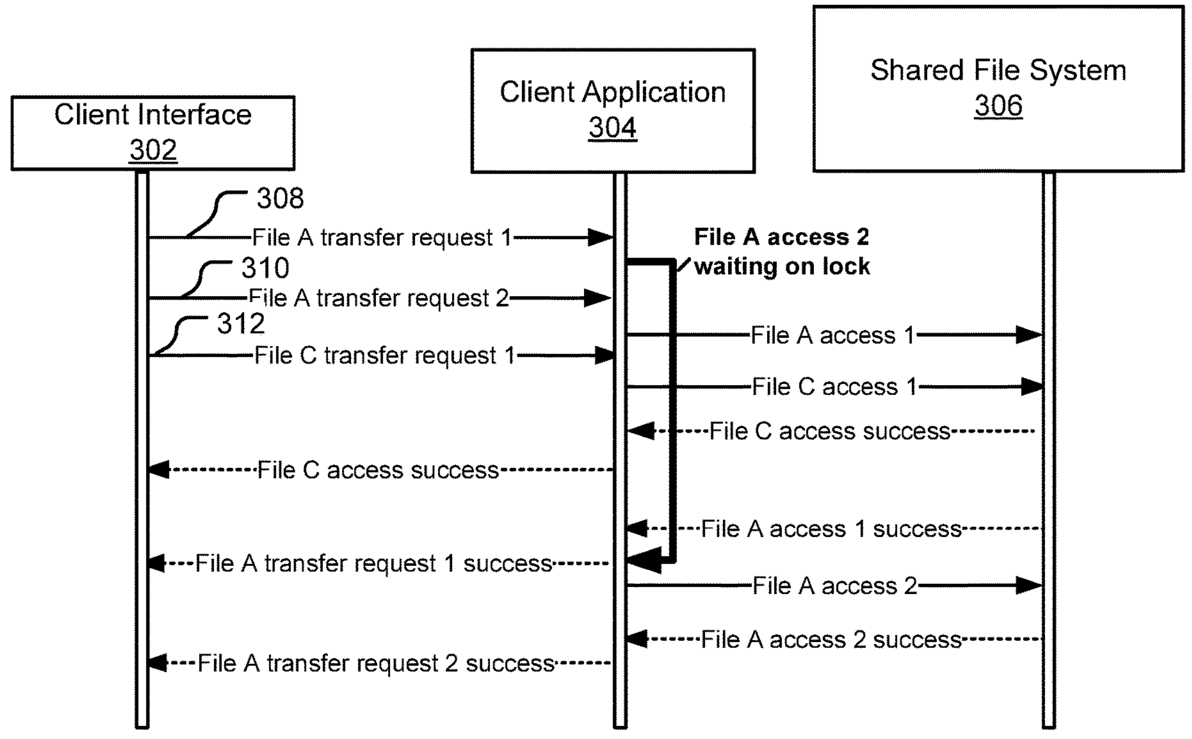

FIG. 3 illustrates example operations 300 of a system that implements conditional locking techniques. In this example, a user interacts with a client interface 302 to a client application 304 to place three different access requests targeting files stored in a shared file system. In this example, the client application 304 is a multi-threaded application and is, for example, a cloud-based application that interfaces with multiple different client interfaces. The client interface 302 submits a first transfer request targeting file A via a first thread 308, a second transfer request targeting file A via a second thread 310, and a third transfer request targeting file C via a third thread 312.

Upon receipt of the first file A transfer request, a concurrency manager (not shown) generates a key (e.g., "key A") at the request of the client application 304 based on attributes of the request (e.g., filename, version, target node). The key is paired with a lock object (e.g., for a newly-created lock, as generally described with respect to FIG. 2). Following this pairing, the first file A transfer request is commenced. Upon receipt of the second request targeting file A, the concurrency manager generates the same key again-key A. Because this key is in use at the time of receipt of the second file A transfer request, the client application 304 enters a "wait" and postpones execution of the second file A transfer request until the lock is reassigned to the second thread 310.

However, while the second transfer request is waiting for the lock to be released from the first thread 308, the concurrency manager receives the third transfer request targeting file C and generates another key-key C. In this case, the key is different from the first two requests because the target file is different. Consequently, the concurrency manager pairs Key C with a new lock object and begins executing the third file transfer request.

As shown, the third file transfer request (targeting file C) is completed first. At this time, the lock object paired with Key C is released, either by reassigning the key-lock pair to another operation or disposing of the lock object if there are no pending requests to use Key C. Following this, the first file A transfer request completes, and the concurrency manager "releases the lock" from the first thread 308 by reassigning the associated key-lock pair to the second thread 310. At this time, the client application 304 begins executing the second file A transfer request and, upon completion, returns the results to the client interface 302. Here, it is seen that the conditional locking mechanism has the effect of preventing concurrent access to a single file-file A-rather than the entire shared file system.

In one implementation, the above-described lock objects acquired in association with each key (e.g., the key generated to access file A and the key generated to access file C) are managed at the operating system level via atomically-implemented operations that guarantee synchronized access and therefore prevent race conditions from arising with respect to the shared files.

Figure 4:
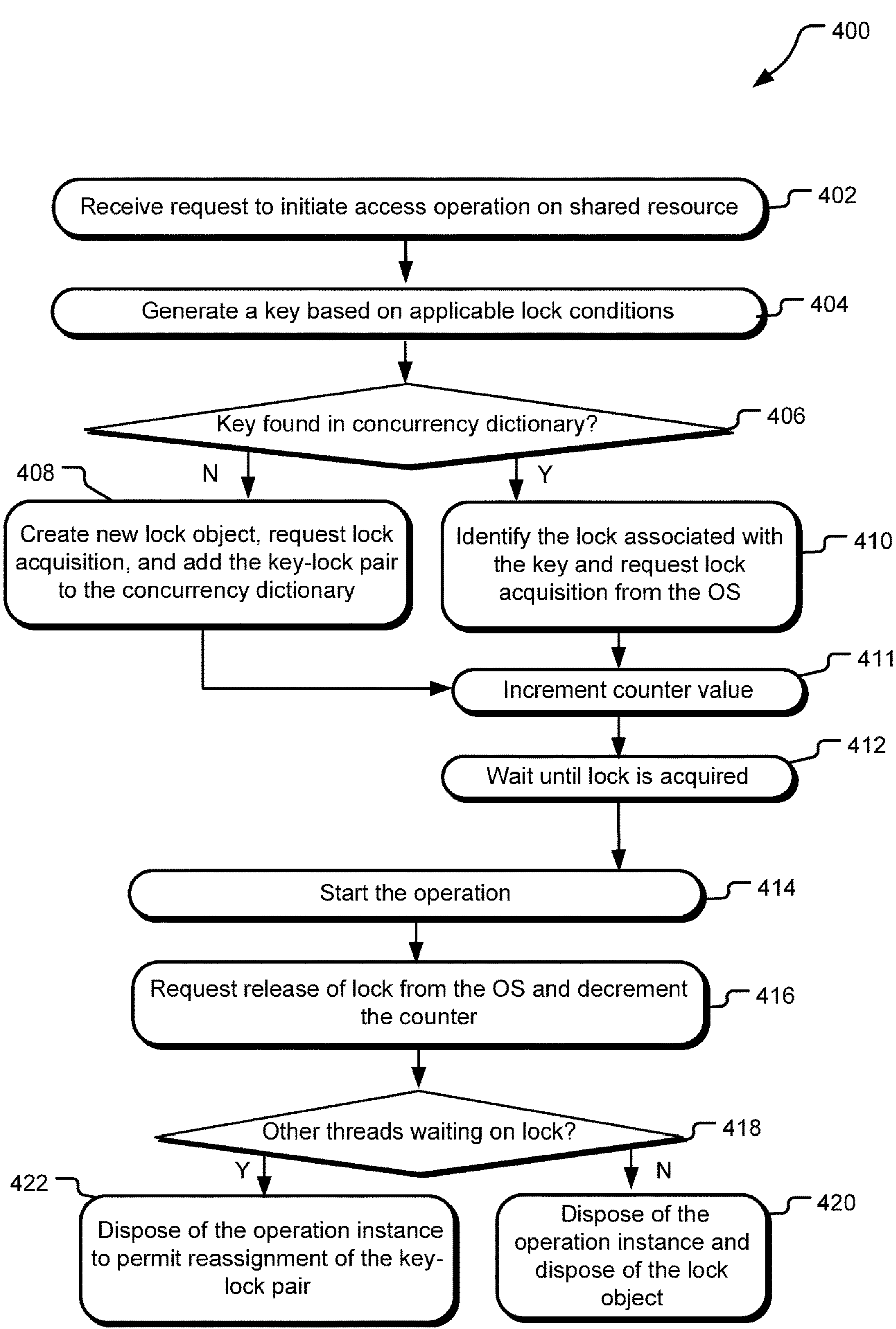
FIG. 4 illustrates example operations for conditionally locking shared resources.

FIG. 4 illustrates example operations 400 for conditionally locking shared resources. A receiving operation 402 receives a request from a multi-thread application to initiate an access operation on a shared resource. The request is associated with a first thread that the multi-thread application is using to communicate with a particular client device.

A key generation operation 404 identifies locking conditions (e.g., attribute fields) applicable to the access operation request and then determines attributes of the request that correspond to the locking conditions. From the attributes, the key generation operation 404 generates a key.

A search and determination operation 406 searches a concurrency dictionary and determines whether the concurrency dictionary includes an entry that includes the key. If not, a lock creation and acquisition operation 408 creates a new lock object and acquires the lock by (1) asking the OS to assign the new lock to the first thread and (2) creating a new entry in the concurrency dictionary including the key/lock pair. A counter incrementation operation 411 increments a count value stored by the new lock (e.g., from '0' to '1' to indicate that there is one thread using or waiting on the lock).

A waiting operation 412 then enters a wait to acquire the new lock object. In this scenario where the lock is newly created, the lock is acquired immediately. The OS creates a memory association indicating that the first thread has acquired the lock. In one implementation, the lock creation and acquisition operation 408 is completed as a single atomic operation. For example, a first global synchronization object is acquired to access the concurrency dictionary (thereby locking the dictionary) and the dictionary is updated to include a new entry at the same time that the lock is created. When the lock is acquired, the first global synchronization object is released, thereby allowing threads to access the concurrency dictionary.

If, alternatively, the search and determination operation 406 determines that the concurrency dictionary already includes an entry that includes the key in association with an existing lock object, an identification and acquisition operation 410 identifies the existing lock object associated with the key in the concurrency dictionary and requests that the first thread be placed in a queue to acquire the existing lock object. The OS then adds an identifier of the first thread to a queue associated with the existing lock object, and a counter incrementation operation 411 increments the count value of the existing lock object to signify that the first thread has been placed in this queue. In one implementation, the identification and acquisition operation 410 and the counter incrementation operation 411 are performed as a single atomic operation. For example, a first global synchronization object is acquired to access the concurrency dictionary (thereby locking the dictionary) and this object is not released until the count value of the existing lock object has incremented.

The waiting operation 412 then commences until such time that the existing lock-key pair is released from other (higher priority) operations and assigned to the requesting operation.

Once a lock has been acquired for the key applicable to the operation requested operation by the first thread, the requesting application is provided with a new instance of the operation class via private constructor in association with a thread identifier indicating which thread has acquired the key. A start operation 414 commences and the access operation is executed on behalf of the first thread. Once the operation is completed, a key release operation 416 requests the OS to release the lock by removing the association between the lock and the first thread. In response, the OS deletes the memory association assigning the lock to the first thread, and the reference counter of the lock is decremented.

A determination operation 418 determines, based on the updated value of the reference counter, whether other threads are waiting on the lock. If so, a key release operation 422 disposes of the operation instance but not the lock object. In this case, the OS identifies a select thread that is next-in-queue to utilize the key, and the OS reassigns the key-lock pair to the next-in-queue thread. A new instance of the operation class is returned via private constructor to the requesting application in association with an identifier for the next-in-queue thread that has now acquired the lock. In turn, the requesting application identifies an outstanding operation request associated with the thread that has now obtained the lock and executes this operation on behalf of the next-in queue thread.

If, on the other hand, the determination operation 418 finds that there are no threads waiting on the lock, a lock disposal operation disposes of the operation instance and disposes of (destroys) the lock object.

Figure 5:
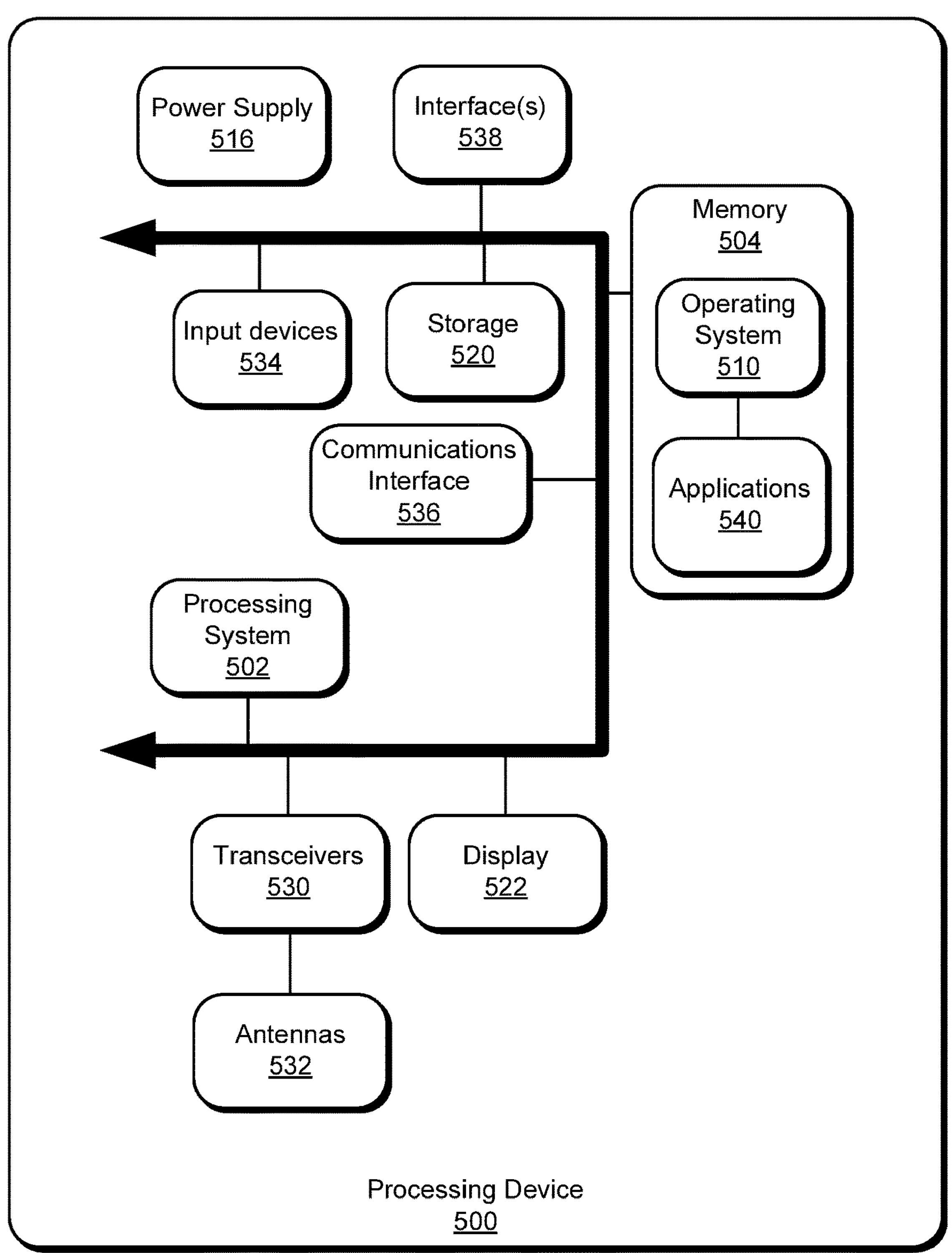
FIG. 5 illustrates an example schematic of a processing device suitable for implementing aspects of the disclosed technology.

FIG. 5 illustrates an example schematic of a processing device 500 suitable for implementing aspects of the disclosed technology. The processing devices 500 includes a processing system 502 comprising one or more processor unit(s), memory device(s) 504, a display 506, and other interfaces 508 (e.g., buttons). The processor unit(s) may each include one or more CPUs, GPUs, etc.

The memory device(s) 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, may resides in the memory device(s) 504 and be executed by the processor unit(s), although it should be understood that other operating systems may be employed.

One or more applications 512 (e.g., a multi-threaded application 102 or concurrency manager 118 of FIG. 1) are loaded in the memory device(s) 504 and executed on the operating system 510 by the processor unit(s). The applications 512 may receive inputs from one another as well as from various input local devices such as a microphone 534, input accessory 535 (e.g., keypad, mouse, stylus, touchpad, gamepad, racing wheel, joystick), and a camera 532. Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include one or more storage devices 528 (e.g., non-volatile storage). Other configurations may also be employed.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes random access memory (RAM), read-only memory (ROM), electrically erasable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

In some aspects, the techniques described herein relate to a tangible processor-readable storage media encoding processor-executable instructions for executing a computer process including: receiving, from a multi-threaded application, a request identifying an operation on a target resource requested by a first client thread; generating a unique key based on an attribute of the request; searching a concurrency dictionary for an entry identifying the unique key; in response to determining that the concurrency dictionary includes an entry identifying the unique key, identifying a lock object that is associated with the unique key in the entry, the lock object being a synchronization primitive; requesting acquisition of the lock object on behalf of the first client thread; and in response to determining that the first client thread has acquired the lock object, transmitting a lock acquisition confirmation to the multi-threaded application.

In some aspects, the techniques described herein relate to a tangible processor-readable storage media, wherein the computer process further includes: requesting, from the operating system, release of the lock object from the first client thread in response to completion of the operation; and in response to determining that the operating system has released the lock object and that there are no other threads awaiting use of the lock object, disposing of the lock object.

In some aspects, the techniques described herein relate to a tangible processor-readable storage media, wherein the computer process further includes: creating a new lock object for the first client thread in response to determining that the unique key is not associated with an existing lock identifier in the concurrency dictionary; requesting, from the operating system, acquisition of the new lock object on behalf of the first client thread; incrementing a count value stored in association with the new lock object; updating the concurrency dictionary to include a new entry identifying the unique key and an identifier of the new lock object; and in response to determining that the first client thread has acquired the new lock object, transmitting the lock acquisition confirmation to the multi-threaded application.

In some aspects, the techniques described herein relate to a tangible processor-readable storage media, wherein the searching of the concurrency dictionary and acquiring the lock object are performed as part of a single atomic operation.

In some aspects, the techniques described herein relate to a tangible processor-readable storage media, wherein the unique key is generated based on at least one of a filename of the target resource that is specified in the request, a type of access operation specified by the request, or a storage location of the target resource.

In some aspects, the techniques described herein relate to a method of generating a conditional lock in a multi-threaded environment, the method including: receiving, from a request source, a request to initiate an operation on a target resource on behalf of a first client thread; generating a unique key based on an attribute of the request; searching a concurrency dictionary for an existing lock identifier associated with the unique key; in response to determining that the unique key is not associated with an existing lock identifier, acquiring a lock object from an operating system and associating an identifier of the lock object with the unique key in the concurrency dictionary; transmitting a lock acquisition confirmation to the request source; and requesting, from the operating system, release of the lock object from the first client thread in response to receiving a confirmation that the operation has completed.

In some aspects, the techniques described herein relate to a method, wherein acquiring the lock object further includes: creating the lock object; transmitting a lock request to the operating system, the lock request including an identifier of the lock object and identifying the first client thread; incrementing a count value stored in association with the lock object; and receiving, from the operating system, a confirmation that the first client thread has been assigned to the lock object.

In some aspects, the techniques described herein relate to a method, further including: in response to determining that the operating system has released the lock object and that there are no other threads awaiting use of the lock object, disposing of the lock object.

In some aspects, the techniques described herein relate to a method, wherein the unique key is generated based on multiple attributes of the request.

In some aspects, the techniques described herein relate to a method, further including: in response to determining that the concurrency dictionary includes an entry associating the unique key with the existing lock identifier, requesting, on behalf of the first client thread, acquisition of an existing lock object associated with the existing lock identifier; receiving a confirmation indicating that the existing lock object has been acquired by the first client thread; in response to receiving the confirmation, transmitting the lock acquisition confirmation to the request source.

In some aspects, the techniques described herein relate to a method, wherein the unique key is generated based on a filename of the target resource that is specified in the request.

In some aspects, the techniques described herein relate to a method, wherein the unique key is based on a type of access operation specified by the request.

In some aspects, the techniques described herein relate to a method, wherein the unique key is generated based on a storage location of the target resource.

In some aspects, the techniques described herein relate to a method, wherein searching the concurrency dictionary and acquiring the lock object are performed as a single atomic operation.

In some aspects, the techniques described herein relate to a system for conditionally locking a shared resource, the system including: a concurrency manager stored in memory that: receives, from a multi-threaded application, a request identifying an operation on a target resource requested by a first client thread; generates a unique key based on an attribute of the request; searches a concurrency dictionary for an entry identifying the unique key; in response to determining that the concurrency dictionary includes an entry identifying the unique key, identifies a lock object that is associated with the unique key in the entry, the lock object being a synchronization primitive provided by an operating system; transmits a request on behalf of the first client thread for acquisition of the lock object associated with the unique key in the entry, in response to confirming that the first client thread has acquired the lock object, transmitting a lock acquisition confirmation to the multi-threaded application.

In some aspects, the techniques described herein relate to a system, wherein the concurrency manager is further configured to: create a new lock object for the first client thread in response to determining that the unique key is not associated with an existing lock identifier in the concurrency dictionary; request acquisition of the new lock object on behalf of the first client thread; updating the concurrency dictionary to include a new entry identifying the unique key and an identifier of the new lock object; and in response to determining that the first client thread has acquired the new lock object, transmits the lock acquisition confirmation to the multi-threaded application.

In some aspects, the techniques described herein relate to a system, wherein the concurrency manager requests the acquisition of the new lock object by transmitting a lock request to the operating system that identifies the first client thread.

In some aspects, the techniques described herein relate to a system, wherein the concurrency manager destroys the lock object in response to determining that the operating system has released the lock object and that there are no other threads awaiting use of the lock object.

In some aspects, the techniques described herein relate to a system, wherein the concurrency manager generates the unique key based on multiple attributes of the request.

In some aspects, the techniques described herein relate to a system, wherein the unique key is generated based on at least one of a filename of the target resource that is specified in the request, a type of access operation specified by the request, or a storage location of the target resource.

In some aspects, the techniques described herein relate to a system of generating a conditional lock in a multi-threaded environment. The system includes a means for receiving, from a request source, a request to initiate an operation on a target resource on behalf of a first client thread; a means for generating a unique key based on an attribute of the request; a means for searching a concurrency dictionary for an existing lock identifier associated with the unique key; a means for acquiring a lock object from an operating system in response to determining that the unique key is not associated with an existing lock identifier; a means for associating an identifier of the lock object with the unique key in the concurrency dictionary; a means for transmitting a lock acquisition confirmation to the request source; and a means for requesting, from the operating system, release of the lock object from the first client thread in response to receiving a confirmation that the operation has completed.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A tangible processor-readable storage media encoding processor-executable instructions for executing a computer process comprising:

receiving, from a multi-threaded application, a request identifying an operation on a target resource requested by a first client thread, the request identifying request attributes including an operation type;

identifying a predefined set of locking conditions collectively defining a granularity for conditionally locking the target resource, the predefined set of locking conditions corresponding to the request attributes and identifying the operation type;

generating a unique key based on the request attributes that correspond to the predefined set of locking conditions;

searching a concurrency dictionary for an entry identifying the unique key;

in response to determining that the concurrency dictionary includes an entry identifying the unique key, identifying a lock object that is associated with the unique key in the entry, the lock object being a synchronization primitive that, when acquired by an application in association with the unique key, prevents concurrent execution of operations of the operation type on the target resource without preventing concurrent execution of all possible types of operations on the target resource;

requesting acquisition of the lock object on behalf of the first client thread; and in response to determining that the first client thread has acquired the lock object, transmitting a lock acquisition confirmation to the multi-threaded application, wherein the multi-threaded application conditionally executes the operation on the target resource in response to receipt of the lock acquisition confirmation.

2. The tangible processor-readable storage media of claim 1, wherein the computer process further comprises:

requesting, from an operating system, release of the lock object from the first client thread in response to completion of the operation; and in response to determining that the operating system has released the lock object and that there are no other threads awaiting use of the lock object, disposing of the lock object.

3. The tangible processor-readable storage media of claim 1, wherein the computer process further comprises:

creating a new lock object for the first client thread in response to determining that the unique key is not associated with an existing lock identifier in the concurrency dictionary;

requesting, from an operating system, acquisition of the new lock object on behalf of the first client thread;

incrementing a count value stored in association with the new lock object;

updating the concurrency dictionary to include a new entry identifying the unique key and an identifier of the new lock object; and in response to determining that the first client thread has acquired the new lock object, transmitting the lock acquisition confirmation to the multi-threaded application.

4. The tangible processor-readable storage media of claim 1, wherein the searching of the concurrency dictionary and acquiring the lock object are performed as part of a single atomic operation.

5. The tangible processor-readable storage media of claim 1, wherein the unique key is generated based on at least one of a filename of the target resource that is specified in the request, a type of access operation specified by the request, or a storage location of the target resource.

6. The tangible processor-readable storage media of claim 1, wherein the computer process further comprises:

matching the operation type and target resource attribute to the predefined set of locking conditions, wherein the predefined set of locking conditions collectively define a granularity for conditionally locking the target resource, and wherein generating the unique key includes applying a predefined set of combinatorial rules to the request attributes that correspond to the locking conditions.

7. The tangible processor-readable storage media of claim 1, wherein generating the unique key is based on the operation type and the unique key includes a component identifying the operation type.

8. A method of generating a conditional lock in a multi-threaded environment, the method comprising:

receiving, from a request source, a request to initiate an operation on a target resource on behalf of a first client thread, the request identifying request attributes including at least an operation type;

identifying a predefined set of locking conditions collectively defining a granularity for conditionally locking the target resource, the predefined set of locking conditions corresponding to the request attributes and identifying the operation type;

generating a unique key based on the request attributes of the request that correspond to the predefined set of locking conditions;

searching a concurrency dictionary for an existing lock identifier associated with the unique key;

in response to determining that the unique key is not associated with an existing lock identifier, acquiring a lock object from an operating system and associating an identifier of the lock object with the unique key in the concurrency dictionary, wherein acquisition of the lock object prevents concurrent execution of operations of the operation type on the target resource without preventing concurrent execution of all possible types of operations on the target resource;

transmitting a lock acquisition confirmation to the request source; and requesting, from the operating system, release of the lock object from the first client thread in response to receiving a confirmation that the operation has completed, wherein the operation is conditionally executed on the target resource in response to receipt of the lock acquisition confirmation.

9. The method of claim 8, wherein acquiring the lock object further comprises:

creating the lock object;

transmitting a lock request to the operating system, the lock request including an identifier of the lock object and identifying the first client thread;

incrementing a count value stored in association with the lock object; and receiving, from the operating system, a confirmation that the first client thread has been assigned to the lock object.

10. The method of claim 8, further comprising:

in response to determining that the operating system has released the lock object and that there are no other threads awaiting use of the lock object, disposing of the lock object.

11. The method of claim 8, wherein the unique key is generated based on multiple attributes of the request.

12. The method of claim 8, further comprising:

in response to determining that the concurrency dictionary includes an entry associating the unique key with the existing lock identifier, requesting, on behalf of the first client thread, acquisition of an existing lock object associated with the existing lock identifier;

receiving a confirmation indicating that the existing lock object has been acquired by the first client thread;

in response to receiving the confirmation, transmitting the lock acquisition confirmation to the request source.

13. The method of claim 8, wherein the unique key is generated based on a filename of the target resource that is specified in the request.

14. The method of claim 8, wherein the unique key is based on a type of access operation specified by the request.

15. The method of claim 8, wherein the unique key is generated based on a storage location of the target resource.

16. The method of claim 8, wherein searching the concurrency dictionary and acquiring the lock object are performed as a single atomic operation.

17. A system for conditionally locking a shared resource, the system comprising:

a concurrency manager stored in memory that:

receives, from a multi-threaded application, a request identifying an operation on a target resource requested by a first client thread, the request identifying request attributes including an operation type;

identifies a predefined set of locking conditions collectively defining a granularity for conditionally locking the target resource, the predefined set of locking conditions corresponding to the request attributes and identifying the operation type;

generates a unique key based on the request attributes that correspond to the predefined set of locking conditions;

searches a concurrency dictionary for an entry identifying the unique key;

in response to determining that the concurrency dictionary includes an entry identifying the unique key, identifies a lock object that is associated with the unique key in the entry, the lock object being a synchronization primitive provided by an operating system that, when acquired by an application in association with the unique key, prevents concurrent execution of operations of the operation type on the target resource without preventing concurrent execution of all possible types of operations on the target resource;

transmits a request on behalf of the first client thread for acquisition of the lock object associated with the unique key in the entry, in response to confirming that the first client thread has acquired the lock object, transmitting a lock acquisition confirmation to the multi-threaded application, wherein the multi-threaded application conditionally executes the operation on the target resource in response to receipt of the lock acquisition confirmation.

18. The system of claim 17, wherein the concurrency manager is further configured to:

create a new lock object for the first client thread in response to determining that the unique key is not associated with an existing lock identifier in the concurrency dictionary;

request acquisition of the new lock object on behalf of the first client thread;

updating the concurrency dictionary to include a new entry identifying the unique key and an identifier of the new lock object; and in response to determining that the first client thread has acquired the new lock object, transmits the lock acquisition confirmation to the multi-threaded application.

19. The system of claim 18, wherein the concurrency manager requests the acquisition of the new lock object by transmitting a lock request to the operating system that identifies the first client thread.

20. The system of claim 17, wherein the concurrency manager destroys the lock object in response to determining that the operating system has released the lock object and that there are no other threads awaiting use of the lock object.

21. The system of claim 17, wherein the concurrency manager generates the unique key based on multiple attributes of the request.

22. The system of claim 17, wherein the unique key is generated based on at least one of a filename of the target resource that is specified in the request, a type of access operation specified by the request, or a storage location of the target resource.

* * * * *